United States Patent Office 3,068,253
Patented Dec. 11, 1962

3,068,253
3-ENOL ETHERS OF 3-KETO-Δ$^{1,4}$-STEROIDS
Leonard M. Weinstock, Highland Park, N.J., assignor to Merck & Co., Inc., Rahway, N.J., a corporation of New Jersey
No Drawing. Filed Nov. 18, 1960, Ser. No. 70,120
20 Claims. (Cl. 260—397.45)

This invention is concerned generally with novel 3-enol ethers of 3-keto-Δ$^{1,4}$-steroid compounds and with processes of preparing the same. More particularly, it relates to novel 3-enol ethers of Δ$^{1,4}$-pregnadiene-17α,21-diol-3,20-diones and the 21-esters thereof, which are potent anti-inflammatory agents, and processes for preparing these compounds.

These novel 3-enol ethers of the 3-keto-Δ$^{1,4}$-pregnadienes (the 3-alkoxy-Δ$^{1,3,5}$-pregnatrienes), subject of the present invention, may be structurally represented as follows:

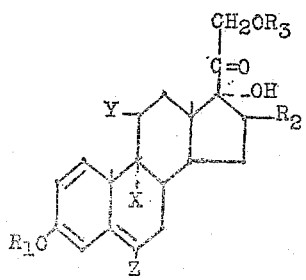

wherein $R_1$ stands for an alkyl, cycloalkyl or benzyl group, $R_2$ stands for hydrogen or an alkyl group, $R_3$ is hydrogen or an acyl group, X is hydrogen or halogen, Y is hydrogen, hydroxy or keto and Z is hydrogen, halogen or a methyl radical.

The above defined novel 3-enol ethers, produced in accordance with the present invention, possess high antiinflammatory activity, considerably greater than that of the parent steroids, and are especially effective for the treatment of arthritis and related diseases since they can be administered for their cortisone-like action in low dosage thereby minimizing undesired side effects.

Processes are known for the manufacture of the 3-enol ethers of 3-keto-Δ$^4$-pregnenes, for example, by stirring together a mixture of the 3-keto-Δ$^4$-pregnene and an alkyl orthoformate in a solvent such as dioxane in the presence of a strong acid. Attempts to apply these methods to the formation of the 3-enol ethers of the 3-keto-Δ$^{1,4}$-pregnadienes, however, are ordinarily unsuccessful due to the low reactivity of the 3-ketone group in the Δ$^{1,4}$-pregnadienes, and in most cases will result only in the recovery of unchanged starting material.

It has now been found that the 3-enol ethers of the 3-keto-Δ$^{1,4}$-pregnadienes, i.e. the 3-alkoxy-Δ$^{1,3,5}$-pregnatrienes, can be readily obtained in good yields starting from the corresponding 3-keto-Δ$^{1,5}$-pregnadiene in place of the 3-keto-Δ$^{1,4}$-pregnadiene.

In preparing our novel chemical compounds, the starting material utilized is the 3-keto-Δ$^{1,5}$-pregnadiene which may be identified by the following structural formula:

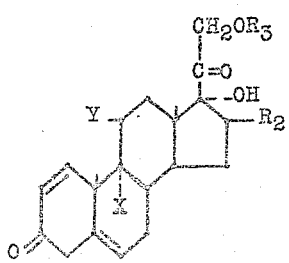

wherein $R_2$ stands for hydrogen or an alkyl group, $R_3$ is hydrogen or an acyl group, X is hydrogen or halogen, and Y is hydrogen, hydroxy or keto. Illustrative of the 21-esters contemplated above are alkanoates such as acetate, propionate and butyrate, aryl esters such as benzoate and the sulfobenzoate, esters from dibasic organic acids such as the succinate and phthalate, and esters from inorganic acids such as sulfate and phosphate.

According to my invention the novel 3-enol ethyl ethers of the 3-keto-Δ$^{1,4}$-pregnadienes are prepared by stirring together a mixture of the 3-keto-Δ$^{1,5}$-pregnadiene with ethyl orthoformate in a solvent in the presence of a strong mineral acid, or an organic sulfonic acid catalyst.

In a preferred embodiment of my invention, using as the starting material a 3-keto-Δ$^{1,5}$-pregnadiene which has no hydroxy group at position 11, or which has a hydroxy group at position 11 but no hydrogen at position 9 (whereby dehydration to the corresponding Δ$^{9,11}$-steroid cannot occur), the ethyl ether is prepared by stirring the steroid with ethyl orthoformate, a small amount of absolute ethanol and a solvent, in the presence of a strong acid catalyst. For example, a mixture of the 3-keto-Δ$^{1,5}$-pregnadiene, dioxane, ethyl orthoformate, a small amount of ethanol and sulfuric acid are stirred together at about 25° C. for approximately 3 hours. The acid is then neutralized with a base such as pyridine. Water is added and the oil separating is crystallized to give the corresponding 3-enol ether. Alternately, the reaction mixture is extracted with a suitable solvent such as ether, and the extract is dried and evaporated under reduced pressure. The residue is then chromatographed to obtain the corresponding 3-enol ethyl ether.

In a preferred embodiment of my invention, using as the starting material a 3-keto-Δ$^{1,5}$-pregnadiene which has both a hydroxy group at position 11, and a hydrogen at position 9 (whereby dehydration to the corresponding Δ$^{9(11)}$-steroid is possible), a mixture of the 3-keto-Δ$^{1,5}$-pregnadiene, absolute ethanol as the only solvent, and ethyl orthoformate are stirred together in the presence of a strong acid catalyst. For example, a mixture of the steroid, absolute ethanol, ethyl orthoformate and 2,4-dinitrobenzene-sulfonic acid are stirred together at room temperature until solution takes place. The mixture is then stirred for a short time longer, after which time it is neutralized with an organic base, such as pyridine. The solution is concentrated to about half-volume, water is added, and the concentration is continued until crystallization of the 3-enol ethyl ether results.

The 3-enol methyl and n-propyl ethers of the 3-keto-Δ$^{1,4}$-pregnadienes are prepared in the same manner as the 3-enol ethyl ethers, but using methyl orthoformate or n-propyl-orthoformate in place of ethyl orthoformate, and methanol or n-propanol in place of ethanol. A slightly longer time is usually required for the formation of the 3-enol-propyl ethers.

The 3-enol n-butyl, cyclopentyl and cyclohexyl ethers of the 3-keto-Δ$^{1,4}$-pregnadienes are prepared by heating a mixture of the 3-keto-Δ$^{1,5}$-pregnadiene and the corresponding alcohol e.g. n-butanol, cyclopentanol or cyclohexanol with isooctane and an organic sulfonic acid, for example, p-toluenesulfonic acid, in an apparatus equipped with means for removing the water from the distillate, and returning the dry distillate to the reaction mixture. The acid catalyst is then neutralized with a base such as pyridine, and the liquid is evaporated to dryness in vacuo. The residue is purified by crystallization, or by chromatography, to give the corresponding 3-enol ether.

The 3-enol benzyl ethers of the 3-keto-Δ$^{1,4}$-pregnadienes are prepared by adding the corresponding 3-enol ethyl ether to an anhydrous mixture of benzene, benzyl alcohol and p-toluene-sulfonic acid. The reaction mixture is then cooled to room temperature, made alkaline and concentrated to dryness under reduced pressure. The residue is purified by crystallization from methanol containing traces of pyridine, or by chromatography, to give the corresponding 3-enol-benzyl ether.

The above methods are applicable to the preparation of the novel 3-alkoxy-$\Delta^{1,3,5}$-pregnatrienes, subject of the present invention. However, it has been found, unexpectedly, that in the case of the 3-alkoxy-$\Delta^{1,3,5}$-pregnatrienes which have a substituent in the 6-position of the steroid molecule, it is also possible to obtain the 3-enol ethers starting with the more readily available 3-keto-$\Delta^{1,4}$-pregnadienes. In a preferred embodiment of our invention the 3-enol ethers of the 6-substituted 3-keto-$\Delta^{1,4}$-pregnadienes, for example, the 6-halogen and the 6-methyl-derivatives, are prepared from the corresponding 3-keto-$\Delta^{1,4}$-pregnadienes using the procedures described above, but starting with the 6-substituted-3-keto-$\Delta^{1,4}$-pregnadiene instead of the 6-substituted-3-keto-$\Delta^{1,5}$-pregnadiene.

The following examples illustrate methods of carrying out the present invention but it is to be understood that these examples are given for purposes of illustration and not of limitation.

*Example 1*

A mixture of two grams of 17$\alpha$,21-dihydroxy-1,5-pregnadiene-3,20-dione 21-acetate, 15 ml. of dry dioxane, 0.2 ml. of absolute ethanol and 2 ml. of ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17$\alpha$,21-dihydroxy-1,3,5-pregnatriene-20-one 21-acetate.

The 17$\alpha$,21-dihydroxy-1,5-pregnadiene-3,20-dione 21-acetate used as starting material for this process is prepared by dissolving 500 mg. of 6$\beta$-bromo-17$\alpha$,21-dihydroxy-1,4-pregnadiene-3,11,20-trione 21-acetate in 150 ml. of alcohol and then adding 25 ml. of water and 5 g. of zinc powder. The suspension is stirred at room temperature for 8 hours, after which time the zinc is filtered, and the filtrate is concentrated to dryness in vacuo. The resulting residue is recrystallized from acetone to yield 17$\alpha$,21-dihydroxy-1,5-pregnadiene-3,20-dione 21-acetate.

*Example 2*

A mixture of two grams of 17$\alpha$,21-dihydroxy-1,5-pregnadiene-3,11,20-trione 21-acetate, 15 ml. of dry dioxane, 0.2 ml. of absolute ethanol and 2 ml. of ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17$\alpha$,21-dihydroxy-1,3,5-pregnatriene-11,20-dione 21-acetate.

*Example 3*

A mixture of two grams of 17$\alpha$,21-dihydroxy-1,5-pregnadiene-3,11,20-trione 21-acetate, 15 ml. of dry dioxane, 0.2 ml. of absolute methanol and 2 ml. methyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-methoxy-17$\alpha$,21-dihydroxy-1,3,5-pregnatriene-11,20-dione 21-acetate.

*Example 4*

Ten grams of 17$\alpha$,21-dihydroxy-1,5-pregnadiene-3,11,20-trione 21-acetate, 100 ml. of n-propanol (distilled from calcium hydride), 10 ml. of n-propyl orthoformate and 0.300 g. of 2,4-dinitrobenzenesulfonic acid are stirred at room temperature for 1–6 hours. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-n-propoxy-17$\alpha$,21-dihydroxy-1,3,5-pregnatriene-11,20-dione 21-acetate.

*Example 5*

A mixture of two grams of 17$\alpha$,21-dihydroxy-1,5-pregnadiene-3,11,20-trione 21-butyrate, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17$\alpha$,21-dihydroxy-1,3,5-pregnatriene-11,20-dione 21-butyrate.

*Example 6*

A mixture of two grams of 17$\alpha$,21-dihydroxy-1,5-pregnadiene-3,11,20-trione, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17$\alpha$,21-dihydroxy-1,3,5-pregnatriene-11,20-dione.

*Example 7*

A mixture of two grams of 9$\alpha$-fluoro-17$\alpha$,21-dihydroxy-1,5-pregnadiene-3,11,20-trione 21-acetate, 15 ml. dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-9$\alpha$-fluoro-17$\alpha$,21-dihydroxy-1,3,5 - pregnatriene - 11,20-dione 21-acetate.

*Example 8*

Ten grams of 9$\alpha$-bromo-17$\alpha$,21-dihydroxy-1,5-pregnadiene-3,11,20-trione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy - 9$\alpha$ - bromo - 17$\alpha$,21 - dihydroxy - 1,3,5 - pregnatriene-11,20-dione 21-acetate.

*Example 9*

A mixture of two grams of 9$\alpha$-chloro-17$\alpha$,21-dihydroxy-1,5-pregnadiene-3,11,20-trione 21-acetate, 15 ml. of dry dioxane, 0.2 ml. of absolute ethanol and 2 ml. of ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture

Example 10

A mixture of two grams of 9α-fluoro-16α-methyl-17α,21-dihydroxy-1,5-pregnadiene-3,11,20-trione 21-acetate, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-9α-fluoro-16α-methyl-17α,21-dihydroxy-1,3,5-pregnatriene-11,20-dione 21-acetate.

Example 11

A mixture of two grams of 9α-fluoro-16β-methyl-17α,21-dihydroxy-1,5-pregnadiene-3,11,20-trione 21-acetate, 15 ml. dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-9α-fluoro-16β-methyl-17α,21-dihydroxy-1,3,5-pregnatriene-11,20-dione 21-acetate.

Example 12

Ten grams of 16α-methyl-17α,21-dihydroxy-1,5-pregnadiene-3,11,20-trione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-16α-methyl-17α,21-dihydroxy-1,3,5-pregnatriene-11,20-dione 21-acetate.

Example 13

A mixture of two grams of 16β-methyl-17α,21-dihydroxy-1,5-pregnadiene-3,11,20-trione 21-acetate, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-16β-methyl-17α,21-dihydroxy-1,3,5-pregnatriene-11,20-dione 21-acetate.

Example 14

A mixture of two grams of 16α-ethyl-17α,21-dihydroxy-1,5-pregnadiene-3,11,20-trione 21-acetate, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-16α-ethyl-17α,21-dihydroxy-1,3,5-pregnatriene-11,20-dione 21-acetate.

Example 15

Ten grams of 9α-fluoro-16α-ethyl-17α,21-dihydroxy-1,5-pregnadiene-3,11,20-trione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-9α-fluoro-16α-ethyl-17α,21-dihydroxy-1,3,5-pregnatriene-11,20-dione 21-acetate.

Example 16

A mixture of two grams of 16α-n-butyl-17α,21-dihydroxy-1,5-pregnadiene-3,11,20-trione 21-acetate, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-16α-n-butyl-17α,21-dihydroxy-1,3,5-pregnatriene-11,20-dione 21-acetate.

Example 17

A mixture of two grams of 16β-n-butyl-17α,21-dihydroxy-1,5-pregnadiene-3,11,20-trione 21-acetate, 15 ml. dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-16β-n-butyl-17α,21-dihydroxy-1,3,5-pregnatriene-11,20-dione 21-acetate.

Example 18

A mixture of two grams of 16α-methyl-17α,21-dihydroxy-1,5-pregnadiene-3,11,20-trione 21-n-propionate, 15 ml. of dry dioxane, 0.2 ml. of absolute ethanol and 2 ml. of ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-16α-methyl-17α,21-dihydroxy-1,3,5-pregnatriene-11,20-dione 21-n-propionate.

Example 19

Ten grams of 11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-11β,17α,21-trihydroxy-1,3,5-pregnatriene-20-one 21-acetate.

Example 20

Ten grams of 9α-fluoro-11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-9α-fluoro-11β,17α,21-trihydroxy-1,3,5-pregnatriene-20-one 21-acetate.

*Example 21*

Ten grams of 9α-fluoro-16α-methyl-11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3 - ethoxy-9α-fluoro-16α-methyl-11β,17α,21-trihydroxy-1,3,5-pregnatriene-20-one 21-acetate which shows ultraviolet absorption λmax.=320, $\epsilon\mu$=4310.

*Example 22*

Ten grams of 9α-fluoro-16β-methyl-11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed with water, and dried to give 3-ethoxy-9α-fluoro-16β-methyl-11β,17α,21-trihydroxy-1,3,5-pregnatriene-20-one 21-acetate.

*Example 23*

Ten grams of 16α-methyl-11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-16α-methyl-11β,17α,21 - trihydroxy - 1,3,5-pregnatriene-20-one 21-acetate.

*Example 24*

Ten grams of 16β-methyl-11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-16β-methyl-11β,17α,21-trihydroxy-1,3,5-pregnatriene-20-one 21-acetate.

*Example 25*

Ten grams of 16α-ethyl-11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-16α-ethyl-11β,17α,21-trihydroxy-1,3,5-pregnatriene-20-one 21-acetate.

*Example 26*

Ten grams of 9α-fluoro-16α-ethyl-11β,17α,21-trihydroxy-1,5-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-9α-fluoro-16α-ethyl-11β,17α,21-trihydroxy-1,3,5-pregnatriene-20-one 21-acetate.

*Example 27*

Ten grams of 6α - chloro - 9α - fluoro - 16α - methyl-11β,17α,21-trihydroxy-1,4-pregnadiene-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-6-chloro-9α-fluoro-16α-methyl-11β,17α,21-trihydroxy - 1,3,5 - pregnatriene-20-one 21-acetate.

The 6α-chloro-9α-fluoro-16α-methyl - 11β,17α,21-trihydroxy-1,4-pregnadiene-3,20-dione 21-acetate used as a starting material in the above example can be prepared by warming a solution of 2.0 g. of 9α-fluoro-16α-methyl-$\Delta^{1,4}$-pregnadiene-11β,17α,21-triol-3,20-dione 21-acetate in 8 ml. of pyridine and 4 ml. of benzoyl chloride, warmed at 50° C. for 3 hours. The solution is then cooled, poured into 5% aqueous NaHCO₃ and extracted with chloroform. The extracts are washed successively with water, 5% HCl, water, 5% NaHCO₃, water, then dried over anhydrous sodium sulfate and concentrated to an oily residue. The crude product is adsorbed on 60 g. of acid-washed alumina and subsequently eluted with ethyl ether to afford 1.65 g. of the crystalline enol-benzoate. After recrystallization from acetone-petroleum-ether, the 9α - fluoro - 16α - methyl - $\Delta^{1,3,5}$ - pregnatriene-3,11β,17α,21-tetrol-20-one-3-benzoate 21-acetate has a melting point of 161–7° C.;

$\lambda_{\text{max.}}^{\text{CH}_2\text{OH}}$ 224 m$\mu$; $\epsilon$% 374; 283 m$\mu$; $\epsilon$% 96; 307 m$\mu$; $\epsilon$% 123

A suspension of 100 mg. of the 9α-fluoro-16α-methyl-$\Delta^{1,3,5}$-pregnatriene-3,11β,17α,21-tetrol-20-one - 3 - benzoate-21-acetate in 2 ml. of glacial acetic acid is cooled to about 15° C. prior to the addition of 28 mg. of N-chlorosuccinimide and a 5% solution of dry hydrogen chloride in 2 ml. of dry tetrahydropyran. The resulting solution is stored at 0–5° C. for 2½ hours and then distributed between chloroform and 5% aqueous NaHCO₃. The CHCl₃ layer is separated and washed with successive portions of water, 5% NaHSO₃, and water. It is then dried over MgSO₄ and concentrated to a colorless oil which crystallizes after trituration with ether. Recrystallization from a mixture of acetone and ethyl ether affords crystals of 6α-chloro-9α-fluoro-16α-methyl-Δ¹,⁴-pregnadiene-11β,17α,21-triol-3,20-dione 21-acetate, M.P. 186–96° C.;

$\lambda_{max.}^{CH_3OH}$ 240 mμ; ε% 320

*Example 28*

A mixture of two grams of 6α-bromo-9α-fluoro-16α-methyl-11β,17α,21trihydroxy-1,4-pregnadiene-3,20-dione 21-acetate, 15 ml. dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-6-bromo-9α-fluoro-16α-methyl-11β,17α,21-trihydroxy-1,3,5-pregnatriene-20-one 21-acetate.

The 6α-bromo-9α-fluoro-16α-methyl-11β,17α,21-trihydroxy-1,4-pregnadiene-3,20-dione 21-acetate used as a starting material in the above example can be prepared by warming a solution of 2.0 g. of 9α-fluoro-16α-methyl-Δ¹,⁴-pregnadiene-11β,17α,21-triol,3,20-dione 21-acetate in 8 ml. of pyridine and 4 ml. of benzoyl chloride, warmed at 50° C. for 3 hours. The solution is then cooled, poured into 5% aqueous NaHCO₃ and extracted with chloroform. The extracts are washed successively with water, 5% HCl, water, 5% NaHCO₃, water, then dried over anhydrous sodium sulfate and concentrated to an oily residue. The crude product is adsorbed on 60 g. of acid-washed alumina and subsequently eluted with ethyl ether to afford 1.65 g. of the crystalline enol-benzoate. After recrystallization from acetone-petroleum-ether, the 9α-fluoro-16α-methyl-Δ¹,³,⁵-pregnatriene-3,11β,17α,21-tetrol-20-one 3-benzoate 21-acetate has a melting point of 161–7° C.;

$\lambda_{max.}^{CH_3OH}$ 224 mμ; ε% 374; 283 mμ; ε% 96; 307 mμ; ε% 123

A suspension of 100 mg. of the 9α-fluoro-16α-methyl-Δ¹,³,⁵-pregnatriene-3,11β,17α,21-tetrol-20-one 3-benzoate 21-acetate in 2 ml. of glacial acetic acid is cooled to about 15° C. prior to the addition of 28 mg. of N-bromosuccinimide and a 5% solution of dry hydrogen chloride in 2 ml. of tetrahydropyran. The resulting solution is stored at 0–5° C. for 2½ hours and then distributed between chloroform and 5% aqueous NaHCO₃. The CHCl₃ layer is separated and washed with successive portions of water, 5% NaHSO₃ and water. It is then dried over MgSO₄ and concentrated to a colorless oil which crystallizes after trituration with ether. Recrystallization from a mixture of acetone and ethyl ether affords crystals of 6α-bromo-9α-fluoro-16α-methyl-Δ¹,⁴-pregnadiene-11β,17α,21-triol-3,20-dione 21-acetate, M.P. 186–96° C.;

$\lambda_{max.}^{CH_3OH}$ 240 mμ; ε% 320

*Example 29*

A mixture of two grams of 9α-fluoro-6α,16α-dimethyl-11β,17α-21-trihydroxy-1,4-pregnadiene-3,20-dione 21-acetate, 15 ml. dry dioxane, 0.2 ml. of absolute ethanol and 2 ml. of ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-9α-fluoro-6α,16α-dimethyl-11β,17α,21-trihydroxy-1,3,5-pregnatriene-3,20-dione 21-acetate.

In accordance with the above procedure, but using as starting material the 9α-fluoro-6α,16α-dimethyl-11β,17α,21-trihydroxy-1,4-pregnadiene-3,20-dione, the 9α-fluoro-6α,16α-dimethyl-17α,21-dihydroxy-1,4-pregnadiene-3,11,20-trione or the 21-acetate thereof, there is obtained the corresponding 3-ethoxy-9α-fluoro-6,16α-dimethyl-11β,17α,21-trihydroxy-1,3,5-pregnatriene-20-one, the 3-ethoxy-9α-fluoro-6,16α-dimethyl-17α,21-dihydroxy-1,3,5-pregnatriene-11,20-dione or the 21-acetate thereof.

The starting materials for the above procedures can be prepared in the following manner:

To a cooled solution of 436 mg. of 6α,16α-dimethyl-4-pregnene-11β,17α,21-triol-3,20-dione 21-acetate in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 6α,16α-dimethyl-4,9(11)-pregnadiene-17α,21-diol-3,20-dione 21-acetate. A suspension of 330 mg. of 6α,16α-dimethyl-3,9(11)-pregnadiene-17α,21-diol-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and the remaining N-bromosuccinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-6α,16α-dimethyl-4-pregnene-11β,17α,21-triol-3,20-dione 21-acetate.

A solution of 210 mg. of 9α-bromo-6α,16α-dimethyl-4-pregnene-11β,17α,21-triol-3,20-dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 6α,16α-dimethyl-9,11-epoxy-4-pregnene-17α,21-diol-3,20-dione 21-acetate.

To a solution of 83 mg. of anhydrous hydrogen fluoride in 4.7 ml. of ice-cold alcohol-free chloroform is added an ice-cold solution of 416 mg. of 6α,16α-dimethyl-9,11-epoxy-4-pregnene-17α,21-diol-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the choloroform layer is washed with water until free of acid, dried, and the chloroform evaporated in vacuo. The residual material is crystallized from acetone-petroleum ether to give 6α,16α-dimethyl-9α-fluoro-4-pregnene-11β,17α,21-triol-3,20-dione 21-acetate. Fifty milligrams of 6α,16α-dimethyl-9α-fluoro-4-pregnene-11β,17α,21-triol-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-11β,17α,21-triol-3,20-dione.

To a solution of 100 mg. of 6α,16α-dimethyl-9α-fluoro-4-pregnene-11β,17α,21-triol-3,20-dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (Super-Cel), to give 6α,16α-dimethyl-9α-fluoro-1,4-pregnadiene-11β,17α,21-triol-3,20-dione 21-acetate. This material is hydrolyzed using 1 N methanolic potassium hydroxide in benzene as described above for the hydrolysis of 6α,16α-dimethyl-9α-fluoro-4-pregnene-11β,17α,21-triol-3,20-dione 21-acetate to give 6α,16α-dimethyl-9α-fluoro-1,4-pregnadiene-11β,17α,21-triol-3,20-dione.

A solution of 400 mg. of 6α,16α-dimethyl-9α-fluoro-4-pregnene-11β,17α,21-triol-3,20-dione 21-acetate in 4 ml. of pyridine is added to the compelx formed by the addition of 400 mg. of chromium trioxide to a 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 6α,16α-dimethyl-9α-fluoro-4-pregnene-17α,21-diol-3,11,20-trione 21-acetate. Fifty milligrams of 6α,16α-dimethyl-9α-fluoro-4-pregnene-17α,21-diol-3,11,20-trione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 6α,16α-dimethyl-9α-fluoro-4-pregnene-17α,21-diol-3,11,20-trione.

To a solution of 100 mg. of 6α,16α-dimethyl-9α-fluoro-4-pregnene-17α,21-diol-3,11,20-trione 21-acetate in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 6α,16α-dimethyl-9α-fluoro-1,4-pregnadiene-17α,21-diol-3,11,20-trione 21-acetate. This material is hydrolyzed using 1 N methanolic potassium hydroxide in benzene as described hereinabove for the hydrolysis of 6α,16α-dimethyl-9α-fluoro-4-pregnene-17α,21-diol-3,11,20-trione 21-acetate to give 6α,16α-dimethyl-9α-fluoro-1,4-pregnadiene-17α,21-diol-3,11,20-trione.

*Example 30*

A mixture of 5 g. of 17α,21-dihydroxy-1,5-pregnadiene-3,20-dione 21-acetate, 550 ml. of isooctane (2,2,4-trimethylpentane), 2.5 ml. of cyclohexanol and 0.25 g. of p-toluenesulfonic acid is refluxed for 32 hours employing an apparatus (such as that described in Organic Synthesis, Collective Vol. III (1955), page 382) equipped in such a way that the isooctane falling from the condenser before returning to the flask is separated from the water entrained by it, by means of a suitable trap supplied with an inner funnel containing phosphorus pentoxide mixed with a filter aid such as Celite (a diatomaceous earth). After cooling, 1 ml. of pyridine is added to neutralize the p-toluene-sulfonic acid and the liquid is completely evaporated in vacuo to dryness to give a residue of 3-cyclohexyloxy-17α-21-dihydroxy-1,3,5-pregnatriene-20-one 21 - acetate. Purification is effected by recrystallization from methanol containing traces of pyridine or alternately, by chromatography over alumina (alkaline) and elution with ether-petroleum ether mixtures.

*Example 31*

A mixture of 5 g. of 17α,21-dihydroxy-1,5-pregnadiene-3,20-dione 21-acetate, 550 ml. of isooctane (2,2,4-trimethylpentane), 2.5 ml. of n-butanol and 0.25 g. of p-toluenesulfonic acid is refluxed for 32 hours employing an apparatus (such as that described in Organic Synthesis, Collective Vol. III (1955), page 382) equipped in such a way that the isooctane falling from the condenser before returning to the flask is separated from the water entrained by it, by means of a suitab'e trap supplied with an inner funnel containing phosphorus pentoxide mixed with a filter aid such as Celite (a diatomaceous earth). After cooling, 1 ml. of pyridine is added to neutralize the p-toluenesulfonic acid and the liquid is completely evaporated in vacuo to dryness to give a residue of 3-n-butoxy-17α,21-dihydroxy-1,3,5-pregnatriene-20-one 21-acetate. Purification is effected by recrystallization from methanol containing traces of pyridine or alternately, by chromatography over alumina (alkaline) and elution with ether-petroleum ether mixtures.

*Example 32*

To a mixture of 125 ml. of benzene and 2.1 ml. of benzyl alcohol is added 30 mgm. of p-toluenesulfonic acid. A small portion of benzene is distilled from the solution to remove traces of moisture. To the remaining solution is added 1 g. of 3-ethoxy-17α,21-dihydroxy-1,3,5-pregnatriene-20-one 21-acetate. The mixture is then heated at the boiling point for 30 minutes with slow, continuous co-distillation of benzene and ethanol. The reaction mixture is then cooled to room temperature, made alkaline by the addition of a few drops of pyridine, and concentrated to dryness under reduced pressure to give a residue of 3-benzyloxy-17α,21-dihydroxy-1,3,5-pregnatriene-20-one 21-acetate. Purification is effected by recrystallization from methanol containing traces of pyridine. Alternately, the product is purified by chromatography over alumina (alkaline) and elution with ether-petroleum ether mixtures.

*Example 33*

Ten grams of 6β-chloro-9α-fluoro-16α-methyl-11β,17α,21 - trihydroxy - 1,4 - pregnadiene - 3,20 - dione - 21 - acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-6-chloro-9α-fluoro-16α - methyl - 11β,17α,21 - trihydroxy - 1,3,5 - pregnatriene-20-one 21-acetate.

The 6β - chloro - 9α - fluoro - 16α - methyl - 11β,17α,21 - trihydroxy - 1,4 - pregnadiene - 3,20 - dione 21-acetate used as a starting material in the above example is prepared by warming a solution of 2.0 g. of 9α-fluoro-16α - methyl - 1,4 - pregnadiene - 11β,17α,21 - triol - 3,20-dione 21-acetate in 8 ml. of pyridine and 4 ml. of benzoyl chloride, warmed at 50° C. for 3 hours. The solution is then cooled, poured into 5% aqueous NaHCO₃ and extracted with chloroform. The extracts are washed successively with water, 5% HCl, water, 5% NaHCO₃, water, and then dried over anhydrous sodium sulfate and concentrated to an oily residue. The crude product is adsorbed on 60 g. of acid-washed alumina and subsequently eluted with ethyl ether to afford 1.65 g. of the crystalline enol-benzoate. After recrystallization from acetone-petroleum-ether, the 9α-fluoro-16α-methyl-1,3,5 - pregnatriene - 3,11β,17α,21 - tetrol - 20 - one - 3-benzoate 21-acetate has a melting point of 161–7° C.;

$\lambda_{max.}^{CH_3OH}$ 224 mμ; ε% 374; 283 mμ; ε% 96; 307 mμ; ε% 123

To a mixture of 5 g. of 9α-fluoro-16α-methyl-1,3,5-pregnatriene - 3,11β,17α,21 - tetrol - 20 - one - 3 - benzoate 21-acetate in 50 ml. of tetrahydrofuran cooled to 0° C., is added 1.69 g. of N chlorosuccinimide and 1.77 g. of p-toluenesulfonic acid hydrate. The reaction mixture is stirred for one hour at 0° C. and then poured into a 3% potassium carbonate solution. The mixture is extracted with 50 ml. of methylene chloride and the methylene chloride extract is washed two times with 25 cc. of water, dried over magnesium sulfate, evaporated to dryness and then flushed once with 10 ml. of benzene. The residue is triturated with ether until a smooth suspension results and then filtered and washed with ether to give 6β - chloro - 9α - fluoro - 16α - methyl - 1,4 - pregnadiene-11β,17α,21-triol-3,20-dione 21-acetate.

*Example 34*

A mixture of two grams of 6β-bromo-9α-fluoro-16α-methyl - 11β,17α,21 - trihydroxy - 1,4 - pregnadiene - 3, 20-dione 21-acetate, 15 ml. dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-6-bromo-9α-fluoro-16α-methyl - 11β,17α,21 - trihydroxy - 1,3,5 - pregnatriene-20-one 21-acetate.

The 6β - bromo - 9α - fluoro - 16α - methyl - 11β,17α, 21 - trihydroxy - 1,4 - pregnadiene - 3,20 - dione 21-acetate used as a starting material in the above example is prepared by warming a solution of 2.0 g. of 9α-fluoro-16α - methyl - 1,4 - pregnadiene - 11β,17α,21 - triol - 3, 20-dione 21-acetate in 8 ml. of pyridine and 4 ml. of benzoyl chloride, warmed at 50° C. for 3 hours. The solution is then cooled, poured into 5% aqueous NaHCO₃ and extracted with chloroform. The extracts are washed successively with water, 5% HCl, water, 5% NaHCO₃, water, then dried over anhydrous sodium sulfate and concentrated to an oily residue. The crude product is adsorbed on 60 g. of acid-washed alumina and subsequently eluted with ethyl ether to afford 1.65 g. of the crystalline enol-benzoate. After recrystallization from acetone-petroleum-ether, the 9α - fluoro - 16α - methyl-1,3,5 - pregnatriene - 3,11β,17α,21 - tetrol - 20 - one - 3-benzoate 21-acetate has a melting point of 161–7° C.;

$\lambda_{max.}^{CH_3OH}$ 224 mμ; ε% 374; 283 mμ; ε% 96; 307 mμ; ε% 123

To a mixture of 5 g. of 9α-fluoro-16α-methyl-1,3,5-pregnatriene - 3,11β,17α,21 - tetrol-20-one-3-benzoate 21-acetate in 50 ml. of tetrahydrofuran cooled to 0° C., is added 1.69 g. of N bromosuccinimide and 1.77 g. of p-toluenesulfonic acid hydrate. The reaction mixture is stirred for 5 minutes at 0° C. and then poured into a 3% potassium carbonate solution. The mixture is extracted with 50 ml. of methylene chloride and the methylene chloride extract is washed two times with 25 cc. of water, dried over magnesium sulfate, evaporated to dryness and then flushed once with 10 ml. of benzene. The residue is triturated with ether until a smooth suspension results and then filtered and washed with ether to give 6β-bromo-9α-fluoro-16α-methyl-1,4-pregnadiene-11β,17α,21-triol-3,20-dione 21-acetate, λmax. 243, ε% 283.

Various changes and modifications may be made in carrying out the present invention without departing from the spirit and scope thereof. Insofar as these changes and modifications are within the purview of the annexed claims, they are to be considered as part of our invention.

I claim:

1. The process which comprises reacting a compound having the following formula:

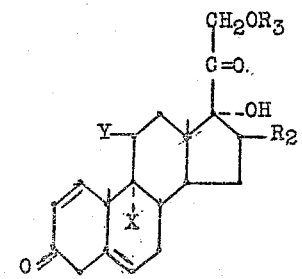

wherein R₂ is a member of the group consisting of hydrogen and methyl, R₃ is a member of the group consisting of hydrogen and lower hydrocarbon carboxylic acyl, X is a member of the group consisting of hydrogen and halogen and Y is a member of the group consisting of hydrogen, β-hydroxy and keto, with a lower alkyl orthoformate and an alkanol in the presence of an inert solvent and acid catalyst to form a compound of the formula:

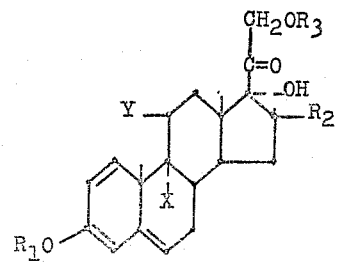

wherein R₁ is a lower alkyl radical and wherein R₂, R₃, X and Y have the significance above defined.

2. The process which comprises reacting a compound having the following structure:

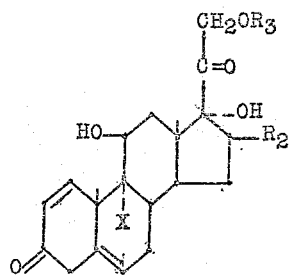

wherein R₂ is a member of the group consisting of hydrogen and methyl, R₃ is a member of the group consisting of hydrogen and lower hydrocarbon carboxylic acyl, X is a member of the group consisting of hydrogen and halogen, with an alkyl orthoformate and the corresponding alkanol in the presence of an aryl sulfonic acid catalyst to form a compound of the formula:

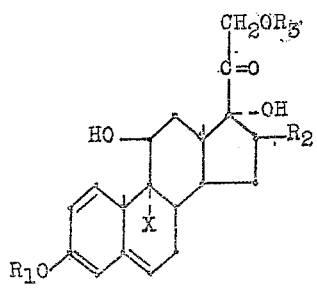

wherein $R_1$ is a lower alkyl radical, and wherein $R_2$, $R_3$ and X have the significance above defined.

3. 3-lower alkoxy-17α,21-dihydroxy-1,3,5-pregnatriene-20-one 21-lower alkanoate.

4. 3-lower alkoxy-9α-halo-17α,21-dihydroxy-1,3,5-pregnatriene-11,20-dione 21-lower alkanoate.

5. 3-lower alkoxy-9α-halo-16-lower alkyl-17α,21-dihydroxy-1,3,5-pregnatriene-11,20-dione 21-lower alkanoate.

6. 3-lower alkoxy-11β,17α,21-trihydroxy-1,3,5-pregnatriene-20-one 21-lower alkanoate.

7. 3-lower alkoxy-9α-halo-11β,17α,21-trihydroxy-1,3,5-pregnatriene-20-one 21-lower alkanoate.

8. 3-lower alkoxy-9α-halo-16-lower alkyl-11β,17α,21-trihydroxy-1,3,5-pregnatriene-20-one 21-lower alkanoate.

9. 3-lower alkoxy-6,9α-dihalo-16-lower alkyl-11β,17α,21-trihydroxy-1,3,5-pregnatriene-20-one 21-lower alkanoate.

10. 3-lower alkoxy-6-methyl-9α-halo-16-lower alkyl-11β,17α,21-trihydroxy-1,3,5-pregnatriene-20-one 21-lower alkanoate.

11. 3-ethoxy-11β,17α,21-trihydroxy-1,3,5-pregnatriene-20-one 21-acetate.

12. 3-ethoxy-9α-fluoro - 11β,17α,21 - trihydroxy - 1,3,5-pregnatriene-20-one 21-acetate.

13. 3 - ethoxy-9α-fluoro-16α-methyl - 11β,17α,21 - trihydroxy-1,3,5-pregnatriene-20-one 21-acetate.

14. 3 - ethoxy-9α-fluoro-16β-methyl - 11β,17α,21 - trihydroxy-1,3,5-pregnatriene-20-one 21-acetate.

15. 3-ethoxy-16α-methyl-11β,17α,21-trihydroxy - 1,3,5-pregnatriene-20-one 21-acetate.

16. 3-ethoxy-16β-methyl - 11β,17α,21 - trihydroxy-1,3,5-pregnatriene-20-one 21-acetate.

17. 3-ethoxy-16α-ethyl - 11β,17α,21 - trihydroxy - 1,3,5-pregnatriene-20-one 21-acetate.

18. 3-ethoxy-9α-fluoro-16α-ethyl-11β,17α,21-trihydroxy-1,3,5-pregnatriene-20-one 21-acetate.

19. 3-ethoxy-9α-fluoro-6,16α-dimethyl - 11β,17α,21 - trihydroxy-1,3,5-pregnatriene-20-one and the 21-acetate thereof.

20. 3 - ethoxy-9α-fluoro-6,16α-dimethyl - 17α,21 - dihydroxy-1,3,5-pregnatriene-11,20-dione and the 21-acetate thereof.

No references cited.